United States Patent Office 3,597,498
Patented Aug. 3, 1971

3,597,498
REINFORCED POLYMERS CONTAINING A MATRIX OF PVC OR ABS WITH A CARRIER OF STYRENE-ACRYLONITRILE REINFORCED WITH ANY OF A POLYCARBONATE, NYLON 66 OR POLYOXYMETHYLENE
Donald I. Christensen, Longmeadow, Mass., assignor to Monsanto Company, St. Louis, Mo.
No Drawing. Filed June 19, 1968, Ser. No. 738,111
Int. Cl. C08g 41/04
U.S. Cl. 260—857                                    14 Claims

ABSTRACT OF THE DISCLOSURE

Disclosed herein are matrix polymers and copolymers reinforced with in situ formed polymeric fibers of high softening point. These fibers are introduced into the matrix polymer by means of a polymeric carrier having a high heat stability and a low flow temperature relative to the matrix polymer. Compositions formed thereby can be molded into articles having increased resistance to deformation under load at high temperatures. The matrix resin may be either polyvinyl chloride or an acrylonitrile-butadiene-styrene resin. The carrier polymer is exemplified by a styrene-acrylonitrile interpolymer reinforced with any of polycarbonate, nylon 66, or polyoxymethylene.

BACKGROUND OF THE INVENTION (1) Field of the invention

This invention relates to a process for the improvement of the dimensional stability and heat distortion temperature of polymers and copolymers by the incorporation therein of in situ-formed polymeric fibers.

(2) Description of the prior art

Through the years a wide variety of thermoplastic resins have been developed and a multitude of uses has been found for them. The particular uses to which the individual resin will be put depends upon, of course, the physical properties of the resin. It follows then, that if the range of physical properties a resin exhibits can be broadened, then the use range for that resin will also be broadened. In particular, one physical property, the effect of temperature upon the resin, has limited the applications for which a thermoplastic resin may be employed. Since, by nature, all thermoplastic resins have a softening or distortion temperature there must, of necessity, be an upper limit to the temperature at which these resins can be used, at least insofar as rigid structures are desired. For example, polystyrene has a glass transition temperature of about 100° C. While there are large numbers of applications with polystyrene at temperatures below 100° C., certainly the market for such a material could be vastly extended if its softening or glass transition temperature could be raised even 10 or 20 centigrade degrees. Polyvinyl chloride polymers and copolymers furnish another example. With polyvinyl chloride the glass transition temperature is about 87° C. It is known that the dimensional stability of polymers such as these can be raised by blending them with other polymers having higher softening points. It has been found, however, that merely blending ready made fibers into a matrix of, for example, polyvinyl chloride, polystyrene and the like does not always result in the obtention of significantly improved products. It is believed that this is due to insufficient adhesion between the matrix and the reinforcing fibers. One way in which this adhesion could be increased would be by forming the fibers within the matrix by an "in situ" process. That is to say, quantities of matrix material and reinforcement material could be blended together and, for example, extruded, such that the reinforcement material would form a discontinuous phase within the matrix phase. Modifications to the process could, of course, be made such that the reinforcing material could be unilaterally or bilaterally oriented, if desired.

Unfortunately, it is not always possible to find conditions suitable for blending the two polymers. With polyvinyl chloride polymers and copolymers in particular, the problem has been acute. For example, nylon 66 would theoretically improve the heat distortion temperature of polyvinyl chloride polymers and copolymers substantially. However, the flow temperature of nylon 66 is higher than the decomposition temperature of the polyvinyl chloride. A need therefore exists for a process by which reinforcing materials which are dimensionally stable at elevated temperatures can be incorporated into polymeric matrices having low heat distortion temperatures without thermally degrading or otherwise harming the polymer matrix but still, at the same time, providing the high adhesion between matrix and fiber which is achievable with in situ processes.

SUMMARY OF THE INVENTION

This invention relates to a process for the incorporation of reinforcing fibers having high heat distortion temperatures into polymers and copolymers and to the products obtained thereby. In particular, this invention relates to a process for reinforcing a thermoplastic matrix resin with fibers comprising: (A) blending a carrier polymer having a flow temperature lower than the decomposition temperature and overlapping with the flow temperature of the matrix resin with a reinforcing polymer having a flow temperature higher than the flow temperature but lower than the decomposition temperature of the carrier polymer, (B) heating the blend to form a melt of the two polymers, (C) forcing the melt through an aperture, (D) then cooling the melt to a temperature below the flow temperature of the reinforcing polymer, whereby a preform comprising a fibrous dispersed phase of reinforcing polymer within a continuous phase of carrier polymer is formed, (E) mixing the preform with the matrix resin to form a second blend, (F) heating the second blend to a temperature at least equal to the flow temperature of the carrier polymer and below the decomposition temperature of the matrix resin thereby forming a melt having unmelted fibers of reinforcing polymers dispersed therein. If desired, this melt of the second blend may be forced through an aperture and subsequently cooled to form a composite of matrix resin, carrier polymer and fibrous reinforcing polymer.

DESCRIPTION OF THE PREFERRED EMBODIMENTS

Fundamentally, the process of this invention involves three polymeric components. There must first be a reinforcing polymer, second, a carrier polymer and third, a matrix polymer. The relationship among these three polymers is determined by the temperature characteristics of the carrier polymer. The carrier must meet four critical criteria relative to the other two polymers:

(1) the flow temperature of the carrier polymer under the conditions of fabrication must be lower than the flow temperature of the reinforcing polymer;
(2) the decomposition temperature of the carrier polymer must be higher than the decomposition temperature of the matrix polymer;
(3) the decomposition temperature of the carrier polymer must be higher than the flow temperature of the reinforcing polymer;
(4) the carrier polymer must flow at a temperature at which the matrix polymer will flow as well as at a temperature at which the reinforcing polymer will flow. It is preferred for ease in processing, but not essential to the invention that the initial flow temperature of the carrier polymer approximate the initial flow temperature of the matrix polymer.

As long as this basic relationship is in effect, it is immaterial which particular polymers are chosen. That is to say, any set of three or more polymeric materials which do not chemically interact may be used in the practice of this invention so long as the above described relationship is maintained. A particular polymer which, for example, in one instance might be useful as the carrier polymer could be the matrix polymer in a second instance with two other polymers, or the reinforcing polymer with a third set. For this reason, it is not possible to provide a list of polymers suitable as matrix polymers, a second list of polymers suitable as carrier polymers and a third list of polymers suitable as reinforcing polymers since, in most mases, the members of one list would also appear on the other two. At any rate one skilled in the art following the teachings hereof can readily define polymer combinations suited to his need at the time. The carrier concept which is the subject of this invention has, however, found particular utility in providing improved heat distortion properties to vinyl chloride polymers and copolymers and to interpolymers of acrylonitrile, butadiene and styrene, e.g., the commercially available ABS resins. With these systems, styrene acrylonitrile copolymers have been found to be particularly useful as carriers and, as reinforcing polymers, polyoxymethylene, nylon and polycarbonates are preferred.

The process of this invention is also useful as a means of incorporating low melting glasses, i.e., those having softening points of up to about 300° C. such as, phosphate glasses, lead borate glasses and the like. It is thus intended to include glasses within the scope of the term "reinforcing polymer" as used in the claims.

The following examples are presented in illustration of the invention and are not intended in any way to limit the scope thereof. Where parts are mentioned, parts by weight are intended unless otherwise designated.

EXAMPLE 1

Part A 70 parts by weight of a 70/30 styrene/acrylonitrile copolymer and 30 parts by weight of a commercially available nylon 6,6 (polyhexamethyleneadipamide) are added to an extruder hopper at a temperature of 50° F. The temperature of the four zones of the extruder are 550°, 550°, 525° and 525° F., respectively. The temperature of the screw, which is turned at about 100 r.p.m., is 50° F. Examination of the extrudate reveals large straight fibers of nylon 6,6 embedded in the SAN.

Part B

To 750 parts of a polyvinyl chloride polymer containing 10% by weight of a graft copolymer of polyvinyl chloride onto chlorinated polyethylene is added 20 parts of a polyvinyl chloride processing aid which is commercially available from the Rohm and Haas Company and is designated "K-120N" and which is an acrylic resin, 20 parts of a commercially available barium-cadmium complex of pentaerythritol laurate, 5 parts of a chelating agent commercially available from the Argus Chemical Company, designated "Stabilizer Mark C" and which is an alkylaryl phosphite and 20 parts of an epoxide plasticizer commercially available from the Rohm and Haas Company and designated "Paraplex G-62." These materials are blended on mill rolls and then ground to granular form.

Part C

To 25 parts of the blend of Part A is added 80 parts of the mixture of Part B. The resulting blend is extruded through an Ankerwerk-Reciprocating screw injection molding apparatus having 3 heating zones at temperatures of 300, 370 and 390° F. The mold used produces samples having a "dog bone" shape and with a cross-section of ½″ by ⅛″.

Part D

The heat distortion temperature of the samples of Part C is measured with the samples under a load of 100 p.s.i. and at an extension of 5%. The heat distortion temperature is found to be 90° C.

Another sample of the same material is suspended in an oven at 130° for one hour. At the end of that time, the shrinkage of the sample is found to be 2.5%. The dimensional stability of the material is measured by laying the samples on a polished plate of steel which has been covered with silicone mold release. The samples and plate are placed in an oven for one hour at 75° C. They are then removed and it is found that there has been no detectable shrinkage during that time. They are returned to the oven for 30 minutes at 90° C. and again it is found that no detectable shrinkage occurs. The cycle is repeated for 30 minutes at 100° C., 120° C., 130° C., and 150° C. Shrinkage at the end of these periods is, respectively, 1.0%, 1.0%, 1.3%, and 2.0%.

The tensile strength of the samples is tested at 75° F. and is found to be 6820 p.s.i.

EXAMPLE 2

Control

To the mixture of Example 1, Part B is added 250 parts of polyvinyl chloride resin. 100 parts of the blend is then subjected to the same extrusion conditions and the same testing as described for the materials of Example 1, Parts C and D. The heat distortion temperature under a stress of 100 p.s.i. at an extension of 5% is found to be 77° C. Shrinkage after suspension in an oven at 130° for one hour is 8.4%. Dimensional stability as measured by the test of Example 1, Part D is as follows:

After one hour at 75° C., 1.5% shrinkage;
An additional 30 minutes at 90° C., 2.0%;
30 minutes more at 100° C., 3.3%;
30 minutes more at 120° C., 4.0%;
Another 30 minutes at 135° C., 6.0% and
An additional 30 minutes at 150° C., 9.7%.
In the tensile test, samples failed at 5410 p.s.i.

EXAMPLE 3

Example 1 is repeated substituting for the nylon 6,6 used therein, polyoxymethylene, specifically Delrin 150, a product of E. I. du Pont de Nemours and Company. In the formation of the SAN/Delrin preform the temperatures of the four zones of the extruded were 450° F., 425° F., 425° F. and 425° F. respectively. Injection molding in this case is carried out in a one ounce ram machine and the samples produced were ¼″ x ³⁄₃₂″ "dog bones." The heat distortion temperature under a stress of 100 p.s.i. and an extension of 5% is 121° C. There is no measurable shrinkage in the dimensional stability test after one hour at 75° nor after an additional 30 minutes at 90°. After two additional 30 minute periods, one at 100° C. and the second at 120° C. the shrinkage is 3.5%. An additional 30 minutes at 135° C. increases the shrinkage to 5% and a final 30 minute period at 150° C. brings the shrinkage to 12.5%.

As a control, samples are prepared in the one ounce machine using the material of Example 2. This time the heat distortion temperature is only 78° C. and there is 2.5% shrinkage after 1 hour at 75° C., 6.5% after an additional ½ hour at 90° C., 8.5% after an additional ½ hour at 100° C., 10.0% after an additional ½ hour at 120° C., 14.0% after another ½ hour at 135° C. and 20% after a final ½ hour period at 150° C.

EXAMPLE 4

Example 3 is repeated substituting polycarbonate resin for the Delrin 150 used therein. The distortion temperature is found to be 112° C. and in the dimensional stability test the percent shrinkage after each of the six heating periods is 0, 0, 5.0, 6.5, 13.0, and 19.0, respectively.

EXAMPLE 5

Example 1 is repeated, except that the composite contains 40% of the SAN/nylon 6,6 preform instead of the 25% preform employed therein. The heat distortion temperature as measured in Example 1 is 109° C. The percent shrinkage of the sample in the demensional stability test after each of the six heating periods is 0, 0, 1.0, 1.0, 1.3, respectively.

Example 1 is repeated in Examples 6–8, infra, substituting the following resins for the SAN carrier used therein:

EXAMPLE 6

An interpolymer containing 60 parts alpha-methylstyrene, 30 parts acrylonitrile, and 10 parts styrene.

EXAMPLE 7

An interpolymer containing 50 parts alpha-methylstyrene, 25 parts acrylonitrile and 25 parts tertiary butyl acrylamide.

EXAMPLE 8

An interpolymer containing 50 parts styrene, 25 parts acrylonitrile and 25 parts tertiary butyl acrylamide.

In each case, results equivalent to those obtained in Example 1 using SAN as carrier are achieved.

EXAMPLE 9

Example 1 is repeated except that an ABS resin of the type that is generally commercially available is substituted for the SAN as carrier. The heat distortion temperature in this case is found to be 94° C. In addition, the material is somewhat easier to process than the corresponding SAN containing material.

EXAMPLE 10

Example 1 is repeated except that in place of the polyvinyl chloride resin matrix and processing aids employed therein Part B, there is substituted a resinous blend of styrene acrylonitrile interpolymer with a graft copolymer of acrylonitrile and styrene onto a styrene butadiene rubber such that the rubber content of the blend is 35%. It is found that the softening temperature at 5% elongation under 100 p.s.i. load is 124° C.

EXAMPLE 11

Example 10 is repeated except that 43 parts of the ABS interpolymer blend employed therein is blended with 57 parts of a preform comprising 70 parts of nylon 6,6 fibrous reinforcing polymer in 30 parts of the 70/30 styrene acrylonitrile copolymer. The softening temperature of this blend is 121° C. A sample of this material is suspended in an oven at 110° C. for 30 minutes. At the end of that time it is found that the sample has undergone 0.0% elongation. A similar sample is suspended in the oven for 30 minutes at 120° C. The percent elongation in this case 0.7.

EXAMPLE 12

Control 45 parts of the resinous interpolymer of the blend of Example 11 is blended with 57 parts of a 70/30 styrene acrylonitrile copolymer containing no fibers. The softening temperature in this instance is found to be 106° C. under 5% elongation and a 100 p.s.i. load. Dimentional stability is tested as in Example 11 and it is found that after 30 minutes at 110° C. the sample has elongated 16% and after a like period of time at 120° C. a second sample has elongated 22%.

It will be obvious, of course, that the materials described herein may be further blended with a variety of fillers, extenders, pigments, plasticizers, etc., without departing from the scope of this invention.

It will further be obvious that many other variations may be made in the products and processes of this invention without departing from the scope thereof.

What is claimed is:

1. A process for reinforcing thermoplastic matrix resins selected from the class consisting of acrylonitrile-butadiene-styrene type resins and vinyl chloride type resins with fibers comprising:
    (A) blending a carrier polymer which is an interpolymer of styrene and acrylonitrile with a reinforcing polymer selected from the group consisting of polycarbonates, polyhexamethylene adipamide, and polyoxymethylene, said carrier polymer:
        (1) having a flow temperature lower than the flow temperature of the reinforcing polymer,
        (2) having a decomposition temperature higher than the decomposition temperature of the matrix polymer and higher than the flow temperature of the reinforcing polymer,
        (3) having the ability to flow at a temperature at which the matrix polymer will flow as well as at a temperature at which the reinforcing polymer will flow, and
        (4) being substantially immiscible with said reinforcing polymer
    (B) heating the blend to form a melt of the carrier polymer and reinforcing polymer,
    (C) forcing the melt through an aperture,
    (D) then, cooling the melt to a temperature below the flow temperature of the reinforcing polymer, whereby a preform comprising a fibrous dispersed phase of reinforcing polymer within a continuous phase of carrier polymer is formed,
    (E) mixing the preform with the matrix resin to form a second blend,
    (F) heating the second blend to a temperature above the flow temperature of the carrier polymer and below the decomposition temperature of the matrix resin, thereby forming a melt having unmelted fibers of reinforcing polymer dispersed therein.

2. The process of claim 1 further comprising forcing the melt of the second blend through an aperture.

3. The process of claim 2 further comprising the step of cooling the melt of the second blend after it has passed through the aperture.

4. The product formed by the process of claim 1.

5. The product formed by the process of claim 2.

6. The product formed by the process of claim 3.

7. The process of claim 1 wherein the matrix resin is selected from the group consisting of polyvinyl chloride homopolymers, interpolymers and blends.

8. The process of claim 1 wherein the matrix resin is selected from the group consisting of polystyrene homopolymers, interpolymers and blends.

9. The process of claim 1 wherein the matrix resin is acrylonitrile-butadiene-styrene.

10. The process of claim 1 wherein the carrier polymer comprises an interpolymer of styrene and acrylonitrile.

11. The process of claim 1 wherein the carrier polymer is acrylonitrile-butadiene-styrene.

12. The process of claim 1 wherein the reinforcing polymer is polyhexamethylene and adipamide.

13. The process of claim 1 wherein the reinforcing polymer is a polycarbonate.

14. The process of claim 1 wherein the reinforcing polymer is polyoxymethylene.

References Cited

UNITED STATES PATENTS

| | | | |
|---|---|---|---|
| 2,870,115 | 1/1959 | Schroeder | 260—857 |
| 3,134,746 | 5/1964 | Grabowski | 260—857 |
| 3,218,371 | 11/1965 | Grabowski | 260—857 |
| 3,322,854 | 5/1967 | Yasui | 260—857 |
| 3,330,899 | 7/1967 | Fukushima | 260—857 |

FOREIGN PATENTS

| | | | |
|---|---|---|---|
| 856,465 | 12/1960 | Great Britain | 260—857 |

PAUL LIEBERMAN, Primary Examiner

U.S. Cl. X.R.

260—873, 893, 898; 264—171, 174, 176, 211, 349